Patented June 8, 1954

2,680,303

UNITED STATES PATENT OFFICE 2,680,303

PROCESS OF PARTIALLY DEHYDRATING FLOUR

Elmer G. Gustavson, Clarendon Hills, Ill., assignor to The Quaker Oats Company, Chicago, Ill., a corporation of New Jersey No Drawing. Application February 15, 1950, Serial No. 144,387

7 Claims. (Cl. 34—13)

This invention relates to ready mixed flours and more particularly to ready mixed flours suitable for use in the production of cakes, muffins, cookies, waffles, biscuits, breads and the like. This application is a continuation in part of my prior application Serial No. 759,715 filed July 8, 1947, now Patent No. 2,525,599.

When cakes are produced in the home by ordinary methods a rather large number of different ingredients are required, an objectionable feature not only because a large stock of the individual ingredients is required but also because the amount of each must be carefully measured as too little or too much of any constituent will produce unsatisfactory results. Numerous attempts in the past have been made to surmount this difficulty by the preparation of ready mixed flours. While such preparations have eliminated the necessity of measuring the individual ingredients for a cake the resulting product has not been wholly satisfactory because of its tendency to deteriorate in storage.

It is a primary object of the present invention to prepare a ready mixed flour which can be stored for long periods of time without deterioration of flavor or volume characteristics of the products made from such flour mixes. Another object of this invention is the production of a ready mixed flour which requires only the addition of water followed by baking to convert it to a cake, muffin, bread, cookie or other food products. A further object of this invention is the provision of a ready mixed flour which upon the formation of a batter or dough therefrom, will bake out to a final product having improved appearance, increased volume and superior eating qualities particularly with respect to fine, moist and tender texture. Further and additional objects will appear from the following description and the appended claims.

In general the objects of my invention may be obtained by dehydrating the flour used in the mixture to a moisture content of about 2 to 8 per cent prior to its use in the mixture. The drying of the flour may be accomplished either at atmospheric pressure or under a vacuum, but whichever method is used it must be done quickly as subjecting flour to a high temperature for a period of any but a minimum time will have a detrimental effect upon it. In fact, it is common belief in the baking industry that flour should not be heated at all because of the danger of damaging the gluten as demonstrated by H. Schneider "Studies on Bread and Bread Making." U. S. Dept. Agr., Office Exptl. Sta. Bul. 101, who found that bread baked from the flour which had been heated to 100° C. was inferior, having a smaller volume and a darker color than bread baked from flour stored at room temperature. C. O. Swanson, in his book entitled "Wheat and Four Quality" Burgess Publishing Company, Minneapolis, Minn. (1941), also stresses the importance of avoiding subjecting flour to high temperatures. For example, on page 124, he points out that the gluten of wheat is damaged considerably when the wheat is stored at 98 to 100° F. On page 126, he makes the statement that flour deteriorates more rapidly than wheat upon storage. Experimental results are given on page 189 demonstrating that heating flour to 45° C. did not damage the gluten but heating it to 70–100° C. decreased the amount of gluten. Contrary to those teachings I have found that if flour is rapidly dried by subjecting it to relatively high temperatures and then quickly cooled in accordance with my invention no damage results and in addition highly desirable qualities are imparted to the flour.

Flour will not dry of itself by storing it in a room under ordinary circumstances, consequently some type of drying equipment is required to dry the flour to the desired moisture content. A drier which I have found convenient and satisfactory for this purpose is the type known as the rotary steam tube drier which consists essentially of a drying cylinder installed at an angle from the horizontal fitted with baffles and steam pipes for heating purposes extending through the cylinder. In operation the cylinder, baffles, and steam pipes revolve as a unit. The material to be dried is introduced at the high end of the drier and as the cylinder rotates the material moves to the low end where it is discharged as a more or less dried product. Generally, to facilitate drying, a current of warm air is passed through the drier countercurrently to the material desired to be dried. Immediately after drying, the flour must be quickly cooled and as a preferred method, I pass the hot flour through an apparatus similar to the drier with the modification that cold water is circulated through the steam pipes rather than steam.

In modern flour milling, bran and certain other components of the wheat berry must be removed which become feed by-products, consequently the yield of flour based upon the quantity of wheat used is always less than 100 per cent, generally about 72 per cent. Depending upon its ultimate use, the flour obtained by this milling process must be further refined. In the event that a very high standard of quality is set the choicest streams consisting of 20 to 40 per cent of the total flour is taken, the remainder being classified as bottoms and clears. Such a flour for the purposes of my invention I characterize as a short extraction flour and if the resultant grade contains more than 40 per cent of the total flour I characterize it as a long extraction flour. While the method described in my co-pending application is particularly applicable to the dehydration of short extraction flours such as high grade cake flours and long extraction flours in which the moisture content is not over about 12 per cent, it is not suitable for drying long extraction flours containing over 12 per cent moisture. If a long extraction flour containing more than 12 per cent moisture is passed through a drier which is heated with steam at a pressure of 25 to 100 pounds per square inch gauge, the quality of the flour will be impaired to such an extent that a cake baked therefrom will be low in volume, nonuniform in texture and it will have a tendency to be gummy and soggy. In the first drying operation the moisture content should be reduced about 1 to 3 per cent depending upon initial moisture content of the flour as the flour from this drier should be reduced to about 11 to 11.5 per cent moisture. In the first drying operation the steam pressure employed should be only about 3 to 5 pounds gauge and the flour should be passed through this drier at such a rate that none of it remains in the drier over 15 minutes. The time required depends, of course, upon the initial moisture content of the flour. Immediately after passing through this drier the flour is quickly cooled by passing it through a drier in which cold water instead of steam is circulated through the pipes. The cooled flour is then passed through another rotary steam tube drier which is heated with steam at any pressure between 25 and 100 pounds per square inch gauge, preferably between the range of 35 to 70 pounds per square inch gauge at such a rate that any given quantity of flour remains in the drier for a period of 15 to 2 minutes depending upon the temperature used. If steam at a pressure of 25 pounds per square inch gauge is employed it may be necessary that the flour remain in the drier the entire 15 minutes, if on the other hand, steam at 100 pounds per square inch gauge is used, 2 minutes may be sufficient. Immediately after drying, the flour is quickly cooled by any suitable means such as passing it through an aspirator or preferably through a rotary tube drier in which cold water instead of steam is circulated through the pipes. In all operations both drying and cooling it is preferable to pass a rapid current of air through the drier and cooler countercurrently to the flow of the flour.

In order to disclose the nature of the present invention still more clearly, illustrative examples of methods of drying flour will hereinafter be described. It should be clearly understood, however, that this is done purely for purposes of illustration and is not to be considered a limitation upon the spirit or scope of the invention.

As a specific example, 150 parts of a 50 per cent extraction flour with a moisture content of 13 per cent was introduced into a rotary steam tube drier which was heated with steam at a pressure of 3 pounds per square inch gauge. The flour was added and the drier was rotated at such a rate that none of the flour remained in the drier for a period exceeding 10 minutes. From the drier the flour which then had a moisture content of 11.5 per cent was quickly cooled by passing it through another rotary steam drier in which cold water was circulated through the steam pipes rather than steam. The cooled flour withdrawn from this cooler was then passed through another rotary steam tube drier which was heated with steam at a pressure of 50 pounds per square inch gauge. The flour was introduced and the drier was rotated at such a rate that none of the flour remained in the drier for a period exceeding 10 minutes. From this drier the flour which then had a moisture content of 4.4 per cent was quickly cooled by passing it through a second cooler. This cooler, like the first, was a rotary steam tube drier in which cold water was circulated through the steam tubes rather than steam.

As another example about 150 parts of cake flour (25 per cent extraction flour) having a moisture content of about 13 per cent by weight was introduced into a rotary steam tube drier in which the tubes were heated with steam at a pressure of about 50 pounds per square inch gauge. The flour was added and the drier was rotated at such a rate that none of the flour remained in the drier for a period exceeding 10 minutes. The flour discharged from this drier was quickly cooled by means of an aspirator or preferably by passing the dried flour through another rotary steam tube drier in which cold water was circulated through the steam pipes rather than steam. The flour was found to have a moisture content of 6 per cent.

In preparing the ready mixed flours of this invention the usual procedure of mixing the ingredients that is well known in the art may be employed. In ready mixed flours containing large percentages of sugar the mixing is effected by thoroughly incorporating a shortening with the sugar and then blending the resulting product with the remaining ingredients. In flour compositions containing little or no sugar the shortening may be blended directly with the flour component of the composition.

After the entire composition has been prepared it may be packaged in the usual manner with suitable directions to the housewife for preparing the desired dough or batter and subsequent baking.

Having now described and illustrated several forms of my invention I wish it to be understood that my invention is not to be limited to the specific details given therein. As for example, in the partial dehydration of a long extraction flour I have described the use of two driers and two coolers. As an alternative method, the cooler following the low temperature drier may be eliminated provided the flour from the first drier is immediately added to a second drier in which the steam pressure is maintained at about 25 to 100 pounds per square inch. Following this drier a cooler must be employed.

I claim:

1. A process of partially dehydrating flour containing more than 12 per cent moisture which comprises passing said flour rapidly through a drier operated at atmospheric pressure the heat exchange surfaces of which are maintained at a temperature corresponding to a steam pressure of about 1 to 5 pounds per square inch gauge, followed by rapidly cooling said flour and then passing said cooled flour rapidly through a second drier operated at atmospheric pressure the heat exchange surfaces of which are maintained at a temperature corresponding to a steam pressure of 25 to 100 pounds per square inch gauge followed by rapidly cooling said partially dehydrated flour.

2. A process of partially dehydrating flour containing more than 12 per cent moisture which comprises passing said flour rapidly through a drier operated at atmospheric pressure the heat exchange surfaces of which are maintained at a temperature corresponding to a steam pressure of about 3 to 5 pounds per square inch gauge, followed by rapidly cooling said flour and then passing said cooled flour rapidly through a second drier operated at atmospheric pressure the heat exchange surfaces of which are maintained at a temperature corresponding to a steam pressure of 25 to 100 pounds per square inch gauge followed by rapidly cooling said partially dehydrated flour.

3. A process of partially dehydrating flour containing more than 12 per cent moisture for subsequent use in ready mixed flours which comprises passing said flour rapidly through a drier operated at atmospheric pressure the heat exchange surfaces of which are maintained at a temperature corresponding to a steam pressure of about 3 to 5 pounds per square inch gauge, followed by rapidly cooling said flour and then passing said cooled flour rapidly through a second drier operated at atmospheric pressure the heat exchange surfaces of which are maintained at a temperature corresponding to a steam pressure of about 25 to 100 pounds per square inch gauge followed by rapidly cooling said partially dehydrated flour.

4. A process of partially dehydrating flour containing more than 12 per cent moisture for subsequent use in ready mixed flours which comprises passing said flour rapidly through a drier operated at atmospheric pressure the heat exchange surfaces of which are maintained at a temperature corresponding to a steam pressure of 3 to 5 pounds per square inch gauge, and then passing said flour rapidly through a second drier operated at atmospheric pressure the heat exchange surfaces of which are maintained at a temperature corresponding to a steam pressure of 25 to 100 pounds per square inch gauge, followed by rapidly cooling said partially dehydrated flour.

5. A process of partially dehydrating flour containing more than 12 per cent moisture to a moisture content of 2 to 8 per cent which comprises passing said flour rapidly through a drier operated at atmospheric pressure the heat exchange surfaces of which are maintained at a temperature corresponding to a steam pressure of 3 to 5 pounds per square inch gauge wherein said moisture content is reduced to 11 to 11.5 per cent and then passing said flour rapidly through a second drier operated at atmospheric pressure the heat exchange surfaces of which are maintained at a temperature corresponding to a steam pressure of 25 to 100 pounds per square inch gauge wherein the moisture content is reduced to 2 to 8 per cent followed by rapidly cooling said partially dehydrated flour.

6. A process of partially dehydrating flour containing more than 12 per cent moisture for subsequent use in ready mixed flours which comprises passing said flour rapidly through a drier operated at atmospheric pressure the heat exchange surfaces of which are maintained at a temperature corresponding to a steam pressure of about 3 to 5 pounds per square inch gauge, followed by rapidly cooling said flour and then passing said cooled flour rapidly through a second drier operated at atmospheric pressure the heat exchange surfaces of which are maintained at a temperature corresponding to a steam pressure of 35 to 70 pounds per square inch gauge followed by rapidly cooling said partially dehydrated flour.

7. A process of partially dehydrating flour containing more than 12 per cent moisture for subsequent use in ready mixed flours which comprises passing said flour through a drier operated at atmospheric pressure the heat exchange surfaces of which are maintained at a temperature corresponding to a steam pressure of about 3 to 5 pounds per square inch gauge at such a rate that none of said flour remains in said drier for a period in excess of 15 minutes, followed by rapidly cooling said flour and then passing said cooled flour through a second drier operated at atmospheric pressure the heat exchange surfaces of which are maintained at a temperature corresponding to a steam pressure of about 25 to 100 pounds per square inch gauge at such a rate that said flour remains in said drier for a period of 15 to 2 minutes, followed by rapidly cooling said partially dehydrated flour.

References Cited in the file of this patent

UNITED STATES PATENTS

| Number | Name | Date |
| --- | --- | --- |
| 14,588 | Appleby | Apr. 8, 1856 |
| 207,051 | Maybury | Aug. 13, 1878 |
| 281,402 | Schumacher | July 17, 1883 |
| 936,947 | Roth | Oct. 12, 1909 |
| 1,318,385 | Huhn | Oct. 14, 1919 |
| 1,371,546 | Bollmans | Mar. 15, 1921 |
| 1,944,880 | Finkel | Jan. 30, 1934 |
| 1,949,427 | McComb | Mar. 6, 1934 |
| 1,950,263 | Pellegrino et al. | Mar. 6, 1934 |
| 2,283,319 | Dienst | May 19, 1942 |
| 2,446,175 | Gerber | Aug. 3, 1948 |
| 2,496,678 | Salo | Feb. 7, 1950 |

FOREIGN PATENTS

| Number | Country | Date |
| --- | --- | --- |
| 180,496 | Great Britain | of 1921 |